United States Patent
Herrero et al.

(10) Patent No.: US 9,609,035 B2
(45) Date of Patent: Mar. 28, 2017

(54) COMPRESSED HEADERS FOR ENCAPSULATED REAL-TIME COMMUNICATIONS

(71) Applicant: Oracle International Corporation, Redwood Shores, CA (US)

(72) Inventors: Rolando Herrero, Derry, NH (US); Henry Katz, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 14/637,550

(22) Filed: Mar. 4, 2015

(65) Prior Publication Data

US 2016/0261558 A1 Sep. 8, 2016

(51) Int. Cl.
*H04J 3/24* (2006.01)
*H04L 29/06* (2006.01)
*H04L 12/46* (2006.01)

(52) U.S. Cl.
CPC .......... *H04L 65/60* (2013.01); *H04L 12/4633* (2013.01); *H04L 69/04* (2013.01); *H04L 69/22* (2013.01)

(58) Field of Classification Search
CPC .... H04L 61/2592; H04L 69/22; H04L 65/608
USPC ........................................ 370/349, 477, 521
See application file for complete search history.

(56) References Cited

U.S. PATENT DOCUMENTS

| | | | | |
|---|---|---|---|---|
| 6,839,339 B1* | 1/2005 | Chuah | ............... | H04L 29/06027 370/349 |
| 2013/0283037 A1* | 10/2013 | Katz | ...................... | H04L 63/04 713/151 |

OTHER PUBLICATIONS

Oracle Communication Session Border Controller, Oracle, Mar. 2016, pp. 1-18.*
Oracle Communications; Oracle Data Sheet; "Acme Packet 4500"; http://www.oracle.com/us/industries/communications/acme-packet-4500-ds-1990148.pdf; last downloaded Oct. 20, 2014.
3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

*Primary Examiner* — Dmitry H Levitan
(74) *Attorney, Agent, or Firm* — Miles & Stockbridge P.C.

(57) ABSTRACT

A system performs tunneling for real time communication ("RTC") between a source endpoint and a destination endpoint. The system receives, by a server, a request from a user equipment ("UE") for enabling header compression of inner internet protocol ("IP") and transport headers of media traffic encapsulated within a tunnel. The media traffic corresponds to the RTC between the source endpoint and the destination endpoint. The system determines a mapping that maps one or more indices to identifying information of the source endpoint and the destination endpoint, and sends a response to the UE including the mapping. Upon sending the response, the UE and the server communicate the media traffic according to the mapping, where the media traffic includes media packets in which inner IP and transport headers are replaced with an index within the one or more indices.

20 Claims, 4 Drawing Sheets

COMPRESSED HEADERS FOR ENCAPSULATED REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

Recently, driven by the growing base of mobile data subscribers, ubiquitous Internet access, and high bandwidth that is now available in both fixed and mobile networks, advanced services accessed via the Internet (known as Over-the-Top ("OTT") services) have become popular. However, while OTT services threaten traditional telephony offerings, innovative service providers are introducing their own OTT services, and must therefore overcome a number of unique challenges as they deploy and market these new services.

SUMMARY

One embodiment is a system for tunneling of real time communication ("RTC") between a source endpoint and a destination endpoint. The system receives, by a server, a request from a user equipment ("UE") for enabling header compression of inner internet protocol ("IP") and transport headers of media traffic encapsulated within a tunnel. The media traffic corresponds to the RTC between the source endpoint and the destination endpoint. The system determines a mapping that maps one or more indices to identifying information of the source endpoint and the destination endpoint, and sends a response to the UE including the mapping. Upon sending the response, the UE and the server communicate the media traffic according to the mapping, where the media traffic includes media packets in which inner IP and transport headers are replaced with an index within the one or more indices.

DETAILED DESCRIPTION

One embodiment provides efficient tunnels for real-time communications ("RTC") services between a client and a tunneling server. In one embodiment, when redundant inner network and transport headers (corresponding to a fixed source and a fixed destination) are transmitted in packetized media traffic that is encapsulated within a tunnel, such headers are replaced by equivalent compressed headers which are understood by the client and the tunneling server. Accordingly, embodiments improve RTC throughput by providing efficient tunneling of media traffic.

Figure 1:
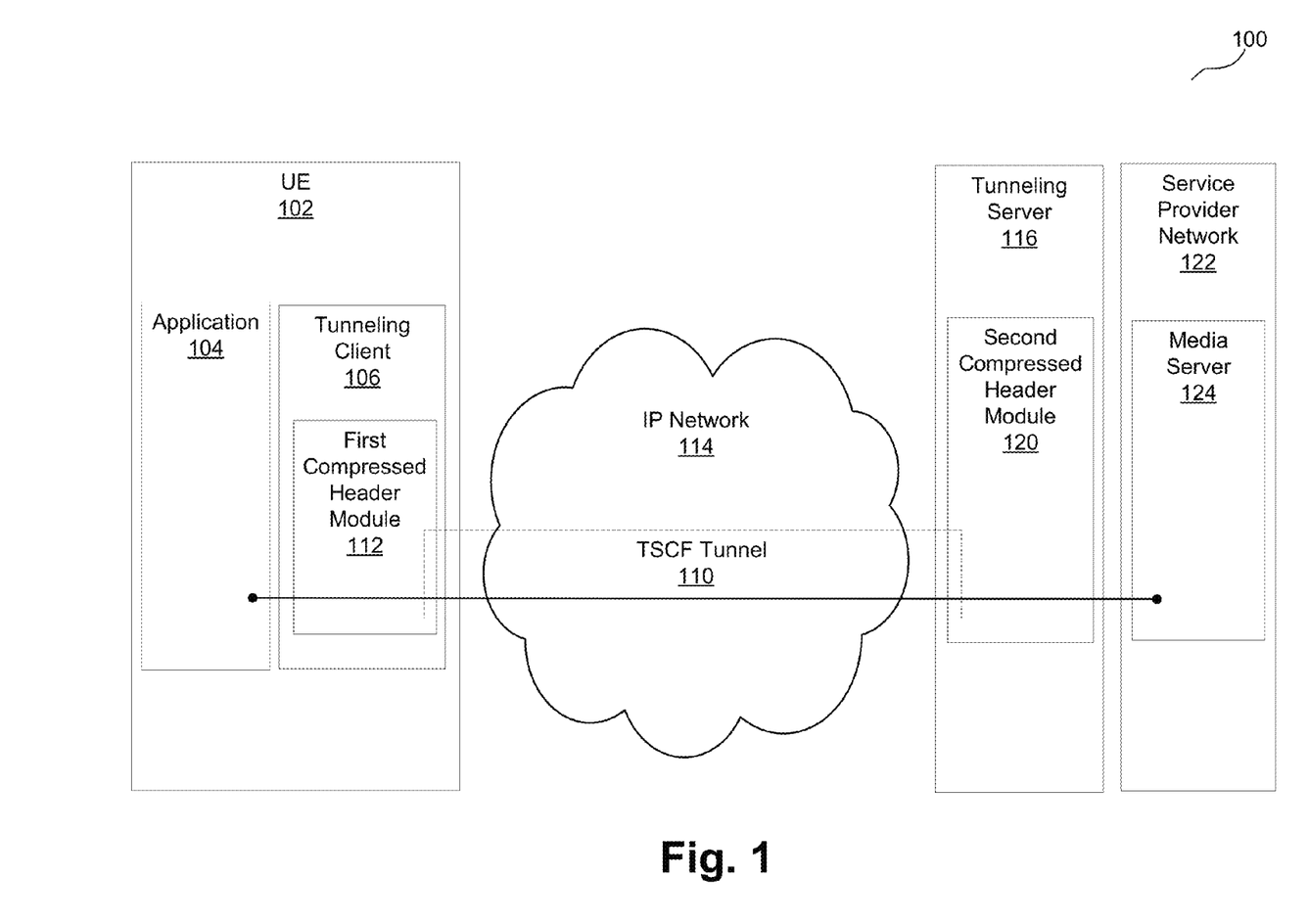
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communication in which users exchange information instantly or with negligible latency. Example applications for RTC include voice and/or video calls, application streaming, softphones, and remote desktop applications. UE 102 may be any device used by an end-user for communication, such as a smartphone, a laptop computer, a tablet, a television, etc.

In performing RTC, UE 102 communicates media traffic (e.g., speech, video, etc.) with a media server 124 in service provider network 122. UE 102 also communicates signaling traffic with a signaling server within service provider network 122 according to an application layer protocol such as the Session Initiation Protocol ("SIP"). SIP is a signaling communications protocol, conventionally used for controlling multimedia communication sessions such as voice and video calls over IP networks. SIP is configured to be independent of the underlying transport layer. Accordingly, SIP can run on different transport protocols, such as the Transmission Control Protocol ("TCP"), the User Datagram Protocol ("UDP"), etc. TCP is one of the core protocols of the IP suite and provides reliable, ordered, and error-checked delivery of a stream of octets between programs running on computers connected to an IP network such as a local area network, an intranet, or the public Internet. A datagram is a basic transfer unit associated with a packet-switched network for which the delivery, arrival time, and order of arrival need not be guaranteed by the network. UDP is a protocol that uses a simple connectionless transmission model with a minimum of protocol mechanisms. Applications that do not require the reliability of a TCP connection may instead use UDP which emphasizes low-overhead operation and reduced latency rather than error checking and delivery validation.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which being incorporated herein by reference.

In general, using a tunnel for communication refers to using a delivery protocol to encapsulate a different payload protocol. The TSCF standard provides client side and server side network elements for establishing managed Transport Layer Security ("TLS") tunnels for performing RTC. TLS is a cryptographic protocol configured to provide communication security over the Internet. TLS is an Internet Engineering Task Force ("IETF") standards track protocol as provided in, for example, IETF request for comments ("RFC") 2246, RFC 4346, RFC 5246, and/or RFC 6176.

In one embodiment, tunneling client 106 and tunneling server 116 establish and manage a TSCF tunnel 110 according to the TSCF standard. TSCF tunnel 110 encapsulates traffic within an outer protocol (e.g., TCP). In this embodiment, UE 102 may use TSCF tunnel 110 to traverse security devices (e.g., firewalls, proxies, etc.) and connect to tunneling server 116 to reach service provider network 122 for performing RTC. In one embodiment, UE 102 may execute a SIP based RTC application 104 that relies on a library such as the software development kit ("SDK") provided by the "Tunneled Session Management Solution" from Oracle Corp.

Figure 2:
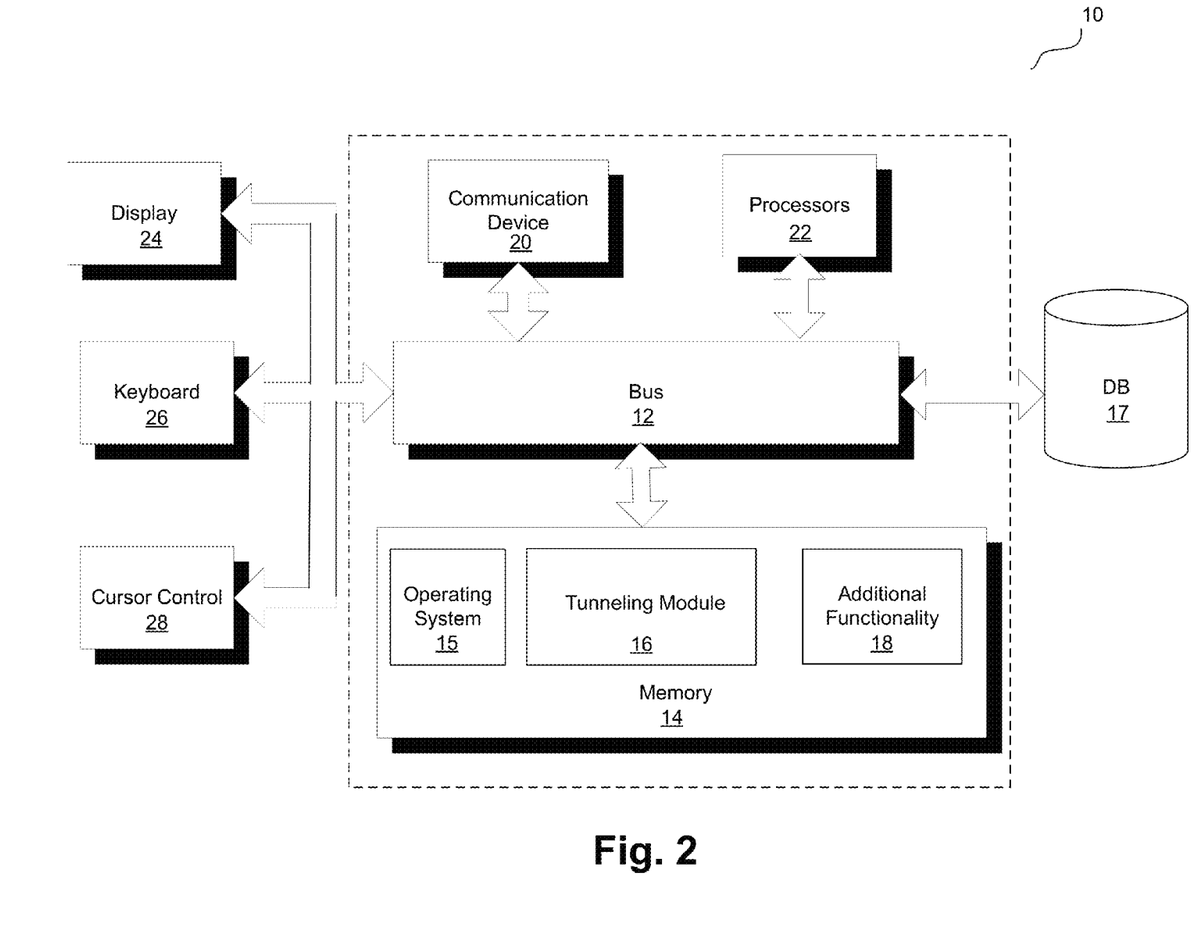
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server 116, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium. System 10 further includes a communication device 20, such as a network interface card, to provide access to a network. Therefore, a user may interface with system 10 directly, or remotely through a network, or any other method.

Computer-readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18.

Figure 4:
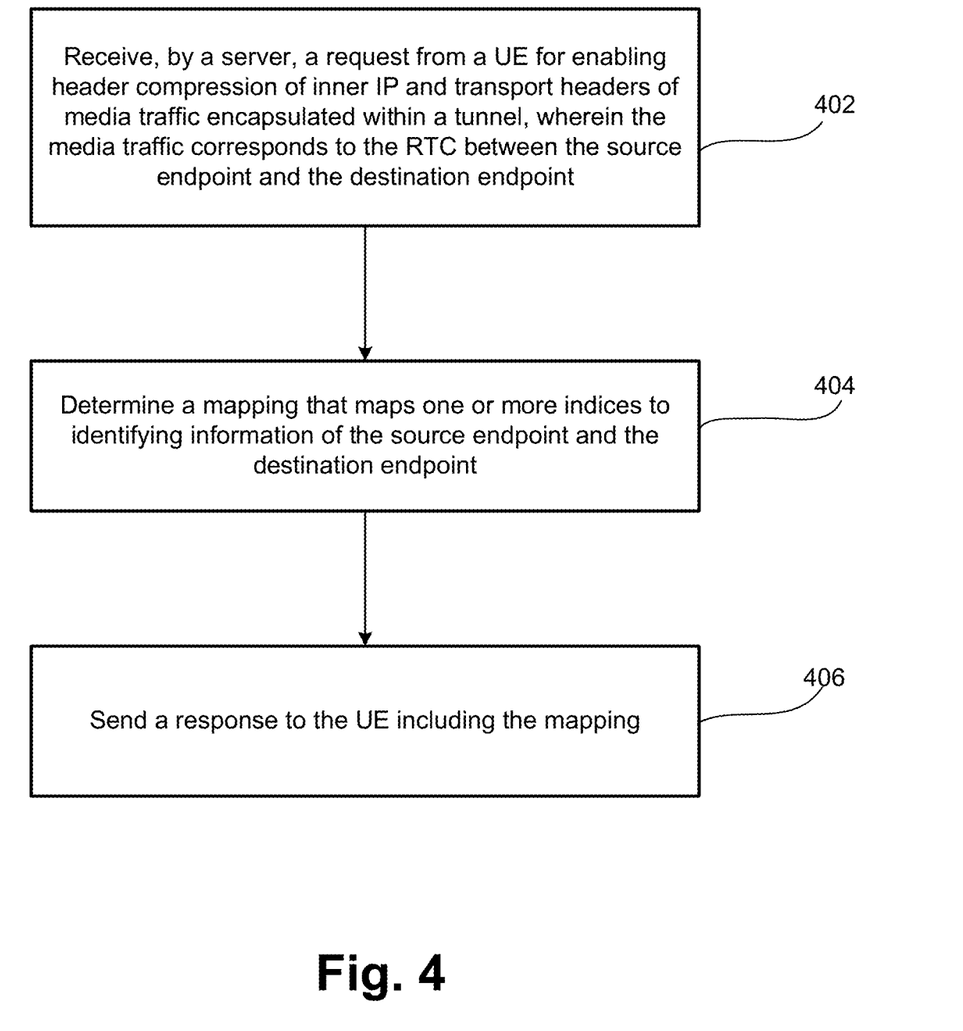
FIG. 4 is a flow diagram of the operation of the tunneling module of FIG. 2 when performing tunneling in accordance with embodiments of the present invention.

In one embodiment, tunneling module 16 and/or additional functional modules 18 may include a receiving module that receives, by a server, a request from a UE for enabling header compression of inner IP and transport headers of media traffic encapsulated within a tunnel, where the media traffic corresponds to the RTC between the source endpoint and the destination endpoint; a determining module that determines a mapping that maps one or more indices to identifying information of the source endpoint and the destination endpoint; and a sending module that sends a response to the UE including the mapping, as will be described herein with reference to FIG. 4.

Referring again to FIG. 1, with some known systems, tunneling client 106 and tunneling server 116 establish TSCF tunnel 110 as a TCP/TLS tunnel that encapsulates UDP media traffic. Table 1 provides example protocol layers when TSCF tunnel 110 is used for encapsulating and communicating UDP media traffic.

TABLE 1

Example protocol layers when UDP traffic is encapsulated in a TSCF tunnel

Application Data
Inner UDP
Inner IP
Outer TCP
Outer IP
Ethernet

With these known systems, RTC media traffic (e.g., speech, video, etc.) inside TSCF tunnel 110 is usually communicated between fixed source and destination IP addresses and transport ports, and specific IP addresses are assigned to tunneling client 106 and tunneling server 116 when they establish, maintain, and terminate TSCF tunnel 110. However, such fixed IP addresses and transport ports are generally included in every single inner IP and transport header (typically 28 bytes).

One disadvantage with this known configuration is that the inclusion of highly redundant information in the inner IP and transport headers results in a waste of bandwidth. This bandwidth waste is further aggravated when very low bitrate codecs are used (i.e., when the amount of payload in each packet is very small). Examples of very low bitrate codecs that implement very small payloads (typically 12 bytes) are the Adaptive Multi Rate ("AMR") codec and the International Telecommunication Union ("ITU") G.711 and G.723 Speech Codecs.

In contrast to the known systems, embodiments of the present invention allow for header compression at the inner UDP layer within a tunneling configuration. In one embodiment, the inner IP and transport headers are replaced with much shorter indices (typically 3 or 4 bytes each) in order to dramatically improve the overall transmission throughput of TSCF tunnel 110. One embodiment first detects redundancy in header transmission, and then adaptively enables or disables header compression accordingly and without client application intervention. Thus, embodiments reduce the required bandwidth for media communication (for example, 12% reduction in required bandwidth for a high bit rate codec such as the ITU G.711 codec, and 65% reduction in required bandwidth for a low bit rate codec such as the AMR codec). One embodiment provides a software application programming interface ("API") at UE 102 that allows for dynamic enabling/disabling of the header compression functionality.

In one embodiment, the header compression functionality is provided based on a bi-directional mapping between each index and a corresponding sequence of inner IP and transport headers. That is, each index corresponds to a specific IP header and transport header (i.e., a sequence of headers), thus a one-to-one mapping is provided between an index and two headers. In one embodiment, the mapping functionality is implemented at a first compressed header module 112 at tunneling client 106 and a second compressed header module 120 at tunneling server 116. Based on the mapping, first compressed header module 112 and second compressed header module 120 perform mapping between IP and transport headers of the inner UDP of media traffic and corresponding indices.

For example, when a media packet is transmitted from UE 102 to tunneling server 116, first compressed header module 112 replaces the IP and transport headers of the inner UDP of the packet with a corresponding index according to the mapping received from tunneling client 116 for the corresponding RTC. Upon reception of the packet by tunneling server 116, second compressed header module 120 replaces the index with corresponding IP and transport headers according to the mapping. The same functionality is provided in the opposite direction when a media packet is transmitted from tunneling server 116 to UE 102.

In one embodiment, the mapping between the inner IP and transport headers and the corresponding indices is dynamically enabled and performed without intervention of application 104. For example, when tunneling client 106 and tunneling server 116 determine that media traffic is communicated between fixed endpoints, they enable header compression functionality for that communication by implementing a respective one of first compressed header module 112 and second compressed header module 120. Accordingly, the implementation of header compression functionality is transparent to application 104.

In one embodiment, the mapping between the inner IP and transport headers and the corresponding indices is based on a hash map. In one embodiment, TSCF tunnel 110 supports up to 256 individual mappings between indices and headers. That is, tunneling server 116 stores a table with 256 entries, where each entry relates an index to an IP header and a transport header (i.e., a sequence of IP and transport headers), thus providing a one-to-one mapping.

One embodiment provides control messages for communicating compressed header media traffic encapsulated within TSCF tunnel 110. According to the TSCF standard, control messages between tunneling clients and a tunneling server are of a "request/response" type, and a control message response for a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

One embodiment provides a TSCF service request control message to enable header compression functionality. In this embodiment, when RTC traffic endpoints have fixed IP address and transport ports, tunneling client 106 sends a TSCF client service request message of type "Enable_Header_Compression" to tunneling server 116, including TSCF client connection information TLVs that identify source and destination endpoints. Subsequently, tunneling server 116 maps this connection information (i.e., IP addresses and transport ports) into an index (for example, an 8-bit index) and sends a TSCF service response control message of type "Enable_Header_Compression" back to tunneling client 106, including a header compression index TLV that indicates the index value that tunneling client 106 should use to identify the corresponding sequence of headers. Thereafter, tunneling client 106 or tunneling server 116 communicate media traffic with inner IP and transport headers replaced with a compressed header (i.e., the index).

In one embodiment, the length of the compressed header is based on the payload size. In one non-limiting example embodiment, the compressed header is either 3 bytes or 4 bytes depending on the amount of data to be sent. Tables 2 and 3 provide example media packet configurations with such compressed headers.

TABLE 2

An example media packet configuration with a 3-byte compressed header

| 0x70 | index | length |
| --- | --- | --- |

TABLE 3

An example media packet configuration with a 4-byte compressed header

| 0x71 | index | length (high) | length (low) |
| --- | --- | --- | --- |

In the example configuration of Table 2, a 3-byte compressed header is used for payload lengths smaller than 256 bytes. In the example configuration of Table 3, a 4-byte header is used for payload lengths between 256 and 65535 bytes.

One embodiment provides a TSCF service request control message to disable header compression functionality. In this embodiment, when UE 102 determines that this functionality needs to be terminated, tunneling client 106 sends a client service request control message of type "Disable Header Compression" to tunneling server 116 to remove the mapping between connection information and indices. This request includes a compression index TLV to indicate that the index needs to be removed.

One embodiment provides a number of TSCF TLVs for implementing client service request control messages of type "Enable_Header_Compression" and "Disable_Header_Compression" for enabling and disabling header compression, respectively. For example, this embodiment provides a TLV for implementing a client service request control message of type "Connection_Info_IPv4" to indicate source and destination IP addresses and ports of the subject endpoints. The client service response control messages to this request is of the same type and includes a "Header_Compression_Index" TLV indicating the index to be used to compress the sequence of IP and transport headers. If tunneling server 116 is not configured to support this functionality, it responds to tunneling client 106 with a TLV indicating an error code (e.g., tsc_response_service_unavailable).

Table 4 provides examples TLVs for implementing TSCF service request and response control messages for implementing header compression according to some present embodiments.

TABLE 4

Example TLVs for implementing TSCF service request and response control
messages for implementing header compression

| TLV Type NAME | Value | SEMANTICS | SHORT/LONG FORMAT | VALUE TYPE | LENGTH | NOTES |
|---|---|---|---|---|---|---|
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable_Header_Compression = 1 Disable_Header_Compression = 2 |
| Header_Compression_Index | 33 | Header Compression Index | Short | Unsigned integer | 1 byte | |

One embodiment marks a network socket at UE 102 as a candidate source socket for header compression. A network socket is an endpoint of an inter-process communication flow across a computer network which is the point for sending or receiving packet delivery services. A datagram socket is a type of connectionless network socket. Each packet sent or received on a datagram socket is individually addressed and routed. A stream socket is a type of connection-oriented and sequenced network socket which provides functionality for creating and destroying connections and for detecting errors. In one embodiment, when a network socket is marked as a candidate source socket for header compression, the software library at UE 102 checks for traffic between that source socket and other destinations. When the software library determines that the number of communicated packets is above a threshold, tunneling client 106 initiates negotiation with tunneling server 116 for enabling header compression functionality.

In one embodiment, header compression functionality is requested by tunneling client 106 via an API (e.g., a tsc_socket API). For example, header compression functionality may be requested by setting a corresponding socket option as provided in the following example functionality.

```
tsc_so_header_compression header_compression =
  tsc_so_tunnel_transport_header_compression_enabled;
  int result = tsc_setsockopt(rtp_socket, SOL_SOCKET,
SO_TSC_HEADER_COMPRESSION,
        (char *)&header_compression,
        sizeof(tsc_so_header_compression));
  where:
  typedef enum
  {
    tsc_so_tunnel_transport_default = 0,
    tsc_so_tunnel_transport_header_compression_enabled,
    tsc_so_tunnel_transport_header_compression_disabled
  } tsc_so_header_compression;
```

In this functionality, if tsc_setsockopt returns −1, the option has not been set correctly, and if it returns 0, it has been set correctly.

Figure 3:
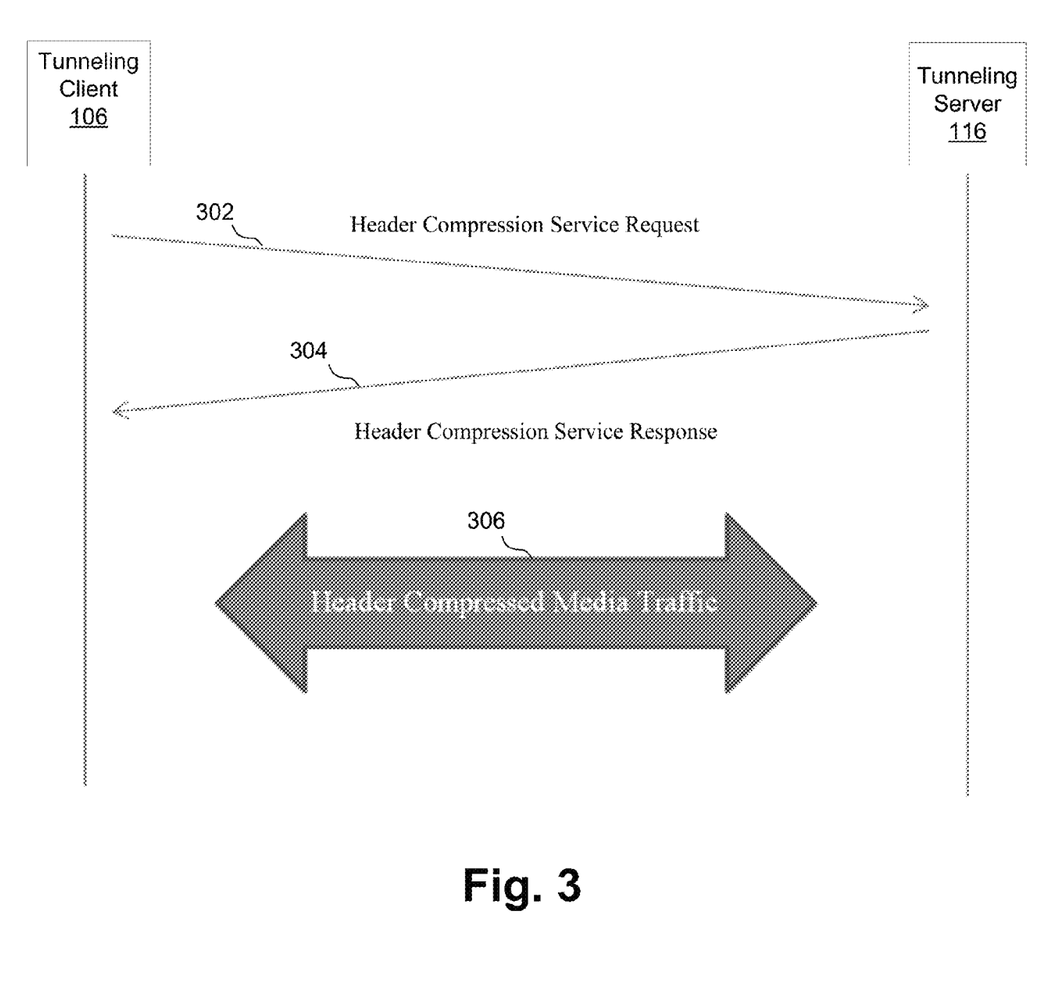
FIG. 3 is a message sequence diagram corresponding to the operation of the tunneling module of FIG. 2 when performing tunneling in accordance with embodiments of the present invention.

FIG. 3 is an example message sequence diagram corresponding to messaging transactions when tunneling client 106 negotiates with tunneling server 116 for enabling header compression functionality, according to some embodiments. Message sequence diagram of FIG. 3 includes network elements such as tunneling client 106 and tunneling server 116, as described herein with reference to FIG. 1.

At 302, tunneling client 106 sends a TSCF service request control message (e.g., a "header compression service request" message) to tunneling server 116 to request enablement of header compression functionality. The message includes TSCF client connection information TLVs that identify source and destination endpoints for media communication.

At 304, tunneling server 116 maps this connection information (i.e., IP addresses and transport ports of the source and destination endpoints) to an index and sends a TSCF service response control message (e.g., a "header compression service response" message) to tunneling client 106. The message includes the index which should be used for mapping.

At 308, tunneling client 106 and tunneling server 116 begin communicating media traffic in which inner IP and transport headers are replaced with a compressed header (i.e., the index).

In one embodiment, the mapping functionality is backward compatible such that new clients may interact with relatively older servers. For example, when at 302 tunneling client 106 sends the "header compression service request" message to tunneling server 116, if tunneling server 116 is older and does not recognize such type of TSCF service request, at 304 it responds back to tunneling client 106 with an error response code to prevent tunneling client 106 from using header compression functionality while not affecting regular tunneling functionality.

In one embodiment, when tunneling client 106 receives the "header compression service response" message from tunneling server 116 at 304, tunneling client 106 uses a notification (e.g., a tsc_notification_header_compression) to indicate to application 104 that header compression functionality is enabled. The following example functionality provides this notification and the corresponding callback.

```
tsc_notification_enable(handle, tsc_notification_header_compression,
  header_compression_notification, NULL);
    void header_compression_notification(tsc_notification_data *notification)
    {
      tsc_notification_header_compression_info_data *header_compression_data =
        (tsc_notification_header_compression_info_data *)notification->data;
```

```
    if (header_compression_data && header_compression_data->available ==
tsc_bool_true) {
        if (header_compression_data->enabled == tsc_bool_true) {
            printf("header compression enabled on socket %d\n",
header_compression_data->socket);
        } else {
            printf("header compression disabled on socket %d\n", header_compression
_data->socket);
        }
    } else {
        printf("header compression not allowed on socket %d\n", header_compression
_data->socket);
    }
}
```

In this example functionality, the fourth NULL parameter in tsc_notification_enable is an opaque/private data pointer that can be recovered in the tsc_notification_data structure upon callback.

FIG. 4 is a flow diagram of tunneling module 16 of FIG. 2 and/or tunneling server 116 of FIG. 1 when performing tunneling in accordance with embodiments of the present invention. In one embodiment, the functionality of the flow diagram of FIG. 4 is implemented by software stored in a memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, tunneling server 116 receives a request from tunneling client 106 for enabling header compression of inner IP and transport headers of media traffic encapsulated within TSCF tunnel 110. The request is a service request control message according to the TSCF standard, and includes a TSCF TLV indicating the identifying information of a source endpoint and a destination endpoint that communicate the media traffic in an RTC. The identifying information includes IP addresses and transport ports of the source endpoint and the destination endpoint. In one embodiment, tunneling client 106 requests enabling of the header compression when detecting media traffic between source and destination endpoints with fixed IP addresses and transport ports.

At 404, tunneling server 116 determines a mapping that maps one or more indices to the identifying information of the source endpoint and the destination endpoint.

At 406, tunneling server 116 sends a response to tunneling client 106 including the mapping. Upon sending the response, tunneling client 106 and tunneling serve 116 may communicate media traffic according to the mapping, where the media traffic includes media packets in which inner IP and transport headers are replaced with an index within the one or more indices. The response is a service response control message according to the TSCF standard and includes a TSCF TLV indicating the mapping.

In one embodiment, the header compression is disabled by tunneling client 106 by sending a corresponding service request control message according to the TSCF standard.

As disclosed, embodiments provide a TSCF tunneling configuration that implements compressed headers. One embodiment determines whether traffic is communicated between a fixed source address/transport and a fixed destination address/transport, and automatically enables/disables header compression functionality accordingly. Thus, when speech or video payloads are packetized and transmitted from a fixed source endpoint to a fixed destination endpoint, the compression of redundant header information results in efficient use of bandwidth. This gain is even more significant when smaller payloads (e.g., payloads of highly efficient low bit rate codecs such as AMR) are communicated. Accordingly, embodiments give the end user the possibility of improving the overall network performance and increasing the number of simultaneous serviceable tunnel clients for a fixed bandwidth. Further, embodiments improve the overall call quality by reducing network congestion.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform tunneling for real time communication (RTC) between a source endpoint and a destination endpoint, the performing comprising:
    receiving, by a server, a request from a user equipment (UE) for enabling header compression of inner internet protocol (IP) and transport headers of media traffic encapsulated as a plurality of packets and traversing a tunnel, wherein the media traffic corresponds to the RTC between the source endpoint and the destination endpoint and wherein the request comprises identifying information of the source endpoint and the destination endpoint, and wherein the media traffic comprises a sequence of inner IP headers and transport headers;
    determining a mapping that maps a different index to each of the sequence of packet inner IP headers and transport headers; and
    sending a response to the UE that includes the determined mapping;
    wherein, after sending the response, each packet received from the UE has its inner IP header and transport header replaced by a corresponding index from the determined mapping.

2. The computer-readable medium of claim 1, further comprising:
    after receiving the packet from the UE that includes the index, replacing at the server the index with the corresponding inner IP header and transport header from the determined mapping.

3. The computer-readable medium of claim 1,
wherein the request is a service request control message according to a tunneled services control function (TSCF) standard;
wherein the response is a service response control message according to the TSCF standard;
wherein the tunnel is a TSCF tunnel.

4. The computer-readable medium of claim 3,
wherein the determined mapping comprises a one-to-one mapping between the index and the inner IP header and the transport header and is based on a hash map.

5. The computer-readable medium of claim 3,
wherein the service response control message includes a TSCF Type Length Value (TLV) indicating the mapping.

6. The computer-readable medium of claim 1,
wherein the header compression is disabled by the UE by sending a service request control message according to a tunneled services control function (TSCF) standard.

7. The computer-readable medium of claim 1,
wherein the UE automatically requests enabling of the header compression when detecting media traffic between source and destination endpoints with fixed IP addresses and transport ports.

8. A method of tunneling for real time communication (RTC) between a source endpoint and a destination endpoint, comprising:
receiving, by a server, a request from a user equipment (UE) for enabling header compression of inner internet protocol (IP) and transport headers of media traffic encapsulated as a plurality of packets and traversing a tunnel, wherein the media traffic corresponds to the RTC between the source endpoint and the destination endpoint and wherein the request comprises identifying information of the source endpoint and the destination endpoint, and wherein the media traffic comprises a sequence of inner IP headers and transport headers;
determining a mapping that maps a different index to each of the sequence of packet inner IP headers and transport headers; and
sending a response to the UE that includes the determined mapping;
wherein, after sending the response, each packet received from the UE has its inner IP header and transport header replaced by a corresponding index from the determined mapping.

9. The method of claim 8, further comprising:
after receiving the packet from the UE that includes the index, replacing at the server the index with the corresponding inner IP header and transport header from the determined mapping.

10. The method of claim 8,
wherein the request is a service request control message according to a tunneled services control function (TSCF) standard;
wherein the response is a service response control message according to the TSCF standard;
wherein the tunnel is a TSCF tunnel.

11. The method of claim 10,
wherein the determined mapping comprises a one-to-one mapping between the index and the inner IP header and the transport header and is based on a hash map.

12. The method of claim 10,
wherein the service response control message includes a TSCF Type Length Value (TLV) indicating the mapping.

13. The method of claim 8,
wherein the header compression is disabled by the UE by sending a service request control message according to a tunneled services control function (TSCF) standard.

14. The method of claim 8,
wherein the UE automatically requests enabling of the header compression when detecting media traffic between source and destination endpoints with fixed IP addresses and transport ports.

15. A system for tunneling of real time communication (RTC) between a source endpoint and a destination endpoint, comprising:
a receiving module that receives, by a server, a request from a user equipment (UE) for enabling header compression of inner internet protocol (IP) and transport headers of media traffic encapsulated as a plurality of packets and traversing a tunnel, wherein the media traffic corresponds to the RTC between the source endpoint and the destination endpoint and wherein the request comprises identifying information of the source endpoint and the destination endpoint, and wherein the media traffic comprises a sequence of inner IP headers and transport headers;
a determining module that determines a mapping that maps a different index to each of the sequence of packet inner IP headers and transport headers; and
a sending module that sends a response to the UE that includes the determined mapping;
wherein, after sending the response, each packet received from the UE has its inner IP header and transport header replaced by a corresponding index from the determined mapping.

16. The system of claim 15, further comprising:
after receiving the packet from the UE that includes the index, replacing at the server the index with the corresponding inner IP header and transport header from the determined mapping.

17. The system of claim 15,
wherein the request is a service request control message according to a tunneled services control function (TSCF) standard;
wherein the response is a service response control message according to the TSCF standard;
wherein the tunnel is a TSCF tunnel.

18. The system of claim 17,
wherein the determined mapping comprises a one-to-one mapping between the index and the inner IP header and the transport header and is based on a hash map.

19. The system of claim 17,
wherein the service response control message includes a TSCF Type Length Value (TLV) indicating the mapping.

20. The system of claim 15,
wherein the header compression is disabled by the UE by sending a service request control message according to a tunneled services control function (TSCF) standard.

* * * * *

UNITED STATES PATENT AND TRADEMARK OFFICE
CERTIFICATE OF CORRECTION

PATENT NO. : 9,609,035 B2  
APPLICATION NO. : 14/637550  
DATED : March 28, 2017  
INVENTOR(S) : Herrero et al.

Page 1 of 1

It is certified that error appears in the above-identified patent and that said Letters Patent is hereby corrected as shown below:

In the Claims

In Column 11, Line 8, in Claim 4, delete "claim 3," and insert -- claim 1, --, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*